Patented Mar. 27, 1945

2,372,577

UNITED STATES PATENT OFFICE 2,372,577

COMPOSITION OF MATTER AND PROCESS OF MAKING

Eugen Hirsch, New York, N. Y.

No Drawing. Application July 23, 1941,
Serial No. 403,760

17 Claims. (Cl. 106—222)

This invention relating as indicated to a composition of matter and process of making same, is more particularly directed to a coating although not restricted to this field of use. The composition and process, while not restricted to use in connection with coatings, will be presented in this association to facilitate comprehension.

The foremost object of the present invention is to provide a vehicle which can be thinned with water and mineral or gum spirits or any combination of the three.

It is also an object to provide a vehicle which although thinable with water will produce a coating which when dry has an extremely high gloss.

It is another object to produce a coating such as a paint, varnish or enamel which does not penetrate the surface to which it is applied and therefore requires only one coat, even where used upon porous surfaces such as raw plaster (i. e. brown coat), open grain wood, concrete, and the like.

It is another object to produce a coating which is odorless when the same is thinned with water and which will withstand outdoor exposure and will not crack, peel or blister.

It is another object to provide a paste which can be thinned with water and after drying, can be recoated with ordinary paint without having to remove, neutralize or size the original coating formed from such paste.

It is a specific object of the invention to combine natural or synthetic gums with mineral or vegetable oils to which urea and potassium carbonate are added to form a vehicle that can be thinned with water or mineral or gum spirits, or with any combination thereof.

It is also an object to provide a vehicle in the form of a paste which contains approximately 95% solids and 5% water.

My invention then, consists of the steps and composition features hereinafter fully described and particularly pointed out in the claims, the following description setting forth in detail certain steps and compositions embodying the invention, such constituting, however, but a few of the various ways in which the principle of the invention may be used.

The vehicle of the present invention is made up from natural gums or resins such as copal, kauri, Manilla copal, rosin, dammar, amber or any other natural gums having characteristics of the foregoing gums, or ester gums, etc., any of the synthetic resins, as phenol-formaldehyde resins, alkyd resins or having varnish producing characteristics, together with oils, urea, an alkaline agent and water. The oil employed may be an oil having some drying qualities such as linseed, soy bean, tung or wood oil, perilla, hydrogenated castor oil, and equivalent compositions and it may include a portion of a mineral oil such as paraffin oil, its homologs or any of the so-called Russian types of mineral oil.

The conventional method of forming a varnish is to cook or highly heat the gums or resins to a certain temperature such as the melting point of the particular type of gum employed and then plasticize or dissolve the gum with oil after which the material is thinned down with mineral spirits. This will produce a varnish which forms a base from which paints or enamels may be manufactured by the known pigment additions. My process is different from the conventional process in that after melting and dissolution of the gum, I add a solution containing urea and an alkaline agent, as for instance potassium carbonate, caustic soda, and the like. This solution is added slowly to the mixture of gum and oil, and ordinarily, when such mixture has a temperature of 450° F., and coming into contact with the highly heated gum and oil, causes a rather violent reaction. For want of a better term, I have defined this reaction as "Hydrolation" and the resulting material I termed "A hydrolated emulsion." The urea forms some ammonium hydroxide but it especially forms a nitrogenous structure which helps to retain color and in producing a film which is much tougher than that produced by similar gums and oils which are not so treated. The resulting vehicle may be mixed with water and even though thinned down with water, can again be mixed or thinned with mineral or hydrocarbon spirits. The molecular structure formed by the reaction of the urea also helps to produce a high gloss on the finished product even though the vehicle is thinned with water and in spite of the fact that water normally has a tendency to produce a dull, flat finish.

As an example:

A mixture of resins and oils is made up with urea, potassium carbonate, water and a small proportion of caustic soda, the amounts of which are as follows:

| | | |
|---|---|---|
| Phenolic or Bakelite resin | ounces | 2 |
| Congo gum | pounds | ½ |
| Ester gum | do | 4 |
| Rosin | do | ½ |
| China-wood oil | do | 4 |
| Linseed oil | do | 6 |
| Blown soy bean oil | do | 2 |
| Urea | ounces | 8½ |
| Potassium carbonate | do | 8½ |
| Caustic soda | do | 1 |
| Water | pounds | 2½ |

The congo gum is heated to a temperature of approximately 650° F. and melted and is then allowed to cool down to about 600° F. Then add the phenolic resin and ester gum and rosin and stir until dissolved which requires about 15 to 20 minutes. When the mixture has cooled to a temperature of 575° F., add the oils listed above and mix thoroughly. The mass is then allowed to cool to 450° F. at which time the water, urea, potassium carbonate and caustic is added. The urea, potassium carbonate and caustic soda are first dissolved in the water and the aqueous solution is added slowly to the mixture of gums and oils. The water in the aqueous solution assists in cooling to approximately 200° F. at which time a gel is formed consisting of 95% solids and 5% water.

As another example:

At least two resins are used and a mixture of oils with the addition of glycerine along with the urea and alkaline components. The proportions are as follows:

| | | |
|---|---|---|
| Phenolic resin | pounds | 1 |
| Rosin | do | 7½ |
| Glycerine | do | ¼ |
| Linseed oil (heavy-kettled boiled) | do | 8 |
| Hydrogenated castor oil | do | 6 |
| Russian type heavy mineral oil | do | 1 |
| Urea | ounces | 8½ |
| Caustic soda | do | 8½ |
| Water | pounds | 2½ |
| Potassium carbonate | ounces | 8½ |

The mixture of resins is heated to about 300° F. and maintained at that temperature for about 25 minutes after which the glycerine, linseed oil and hydrogenated castor oil are added. These materials are thoroughly stirred into the gums and the mass is heated again for approximately 40 minutes at about 575° F. It is then allowed to cool down to about 450° F. at which time the aqueous solution of urea and caustic and potassium carbonate is added slowly similarly to the procedure set forth above. After the addition of the aqueous solution, the resulting product will be a gel containing 95% solids and 5% water.

As another example:

Take either of the vehicles described in the foregoing and to 1 lb. of such vehicle, add 22 oz. of water or mineral spirits or both, as desired. The vehicle is thoroughly stirred into the water or spirits after which 1 lb. 6 oz. of titanium dioxide is thoroughly mixed and ground in to the thinned vehicle. This will result in a paste which can be thinned with about 20% of water or mineral spirits or both. When this material is applied either by brush, spraying or dipping, it dries with a high gloss and is extremely tough. When water is used alone instead of spirits it will be absolutely odorless and obviously, if spirits are used it will have the odor of the particular spirit material. The enamel can of course, be colored also with suitable pigments to any desired color.

As another example:

In the event that it is desired to produce a clear varnish, one part of either of the vehicles described above can be mixed with two parts of water and this will make a varnish that is absolutely odorless, non-penetrating and that can be brushed or sprayed on wood, glass or on highly polished surfaces. It is important to note that the varnish which has been thinned with water dries with a transparent tough surface having a high gloss. Furthermore, the product is tough and not brittle and has remarkable sealing properties due to the fact that it is non-penetrating.

As another example:

| | Ounces |
|---|---|
| Vehicle (as described in first two examples) | 16 |
| Mineral spirits | 22 |
| Titanium dioxide | 22 |

The mineral spirits and titanium dioxide when thoroughly mixed with the vehicle produces an enamel having a high gloss. If desired, it can be thinned down with water and/or more mineral spirits.

As another example:

| | Ounces |
|---|---|
| Vehicle | 16 |
| Water | 16 |
| Mineral spirits | 8 |

As another example:

| | Ounces |
|---|---|
| Vehicle | 16 |
| Zinc resinate | 2 |
| Water | 28 |
| Titanium dioxide | 26 |

These materials when mixed and ground in, produce an odorless egg shell coating which will be water insoluble after 24 hours.

As another example:

| | Ounces |
|---|---|
| Vehicle | 16 |
| Zinc resinate | 2 |
| Water | 10 |
| Mineral spirits | 10 |
| Titanium dioxide | 22 |

This produces an enamel which on drying has an extremely high gloss.

From the foregoing description, it will be seen that I have provided a composition of matter composed of materials which ordinarily are immiscible with water and yet the producet can be thinned with water. The advantages flowing from such a material are manifold. For example, a coating base in the form of a paste can be shipped from the point of manufacture to the point of use and since water is available in almost every locality, it is not necessary to incur the expense of shipping thinners such as mineral spirits. Another advantage is that the coating although extremely tenacious is non-penetrating and can therefore be applied to any porous surface such as open grain wood, raw plaster, and the like and will produce a smooth coherent coating even though applied in a single layer. Another outstanding advantage of my novel composition is that when the vehicle is reduced with water, it is absolutely odorless making it an excellent material to be used in hospitals and stores or other places where the odor of conventional thinners is objectionable. A further advantage of my composition is that it dries in at least 24 hours and although thinned with water, it is not water-soluble after it has dried. It can be washed 24 hours after it has been applied and one coat is sufficient without previous sizing. The material can be brushed, sprayed or it can be used in a dipping tank, and it possesses the remarkable property of not exhibiting brush marks nor will it peel, crack or blister. It can be used over previous coats of water paints, oil paints, varnishes, enamels and the like, and it can be recoated with any type of coating such as lacquers, paints or water-dispersed coatings.

It is to be understood that the word "spirits" refers more particularly to paint and varnish makers' naphtha which is a special naphtha distillate from petroleum. Solvent naphtha from coal tar may be used as an equivalent or alcohol may be used as a thinner although, of course, it is more expensive.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:

1. A process for producing a coating material which comprises heating a mixture including a resin which melts at an elevated temperature and an oil having drying properties which is miscible therewith to a temperature sufficiently high to melt the resin and form a solution thereof with the oil, and mixing urea with said solution while it is at a temperature above the decomposition temperature of urea, to form a resultant product which is miscible with water and with mineral or gum spirits.

2. A process for producing a coating material which comprises heating a mixture including a resin which melts at an elevated temperature and a vegetable oil having drying properties which is miscible therewith to a temperature sufficiently high to melt the resin and form a solution thereof with the oil, and mixing urea with said solution while it is at a temperature above the decomposition temperature of urea, to form a resultant product which is miscible with water and with mineral or gum spirits.

3. A process for producing a coating material which comprises heating a mixture including a resin which melts at an elevated temperature and a vegetable oil having drying properties which is miscible therewith to a temperature sufficiently high to melt the resin and form a solution thereof with the oil, and mixing urea and an alkaline reagent with said solution while it is at a temperature above the decomposition temperature of urea, to form a resultant product which is miscible with water and with mineral or gum spirits.

4. A process for producing a coating material which comprises heating a mixture including a resin which melts at an elevated temperature and a vegetable oil having drying properties which is miscible therewith to a temperature sufficiently high to melt the resin and form a solution thereof with the oil, and mixing an aqueous solution of urea and potassium carbonate with said solution while it is at a temperature above the decomposition temperature of urea, to form a resultant product which is miscible with water and with mineral or gum spirits.

5. A process for producing a coating material which comprises heating a mixture including a resin which melts at an elevated temperature and oil having drying properties which is miscible therewith to a temperature above about 450° F. and sufficiently high to cause a solution of the resin and oil to be formed, and mixing an aqueous solution of urea and an alkaline reagent with the resin and oil solution while the solution is at a temperature sufficiently high to cause decomposition of the urea, whereby a resultant product miscible with water and with mineral or gum spirits is formed.

6. A process for producing a coating material which comprises heating a mixture including a vegetable oil having drying properties and a resin which at a temperature of 575° F. will form a solution with the oil at approximately such temperature, mixing with the resultant oil and resin solution an aqueous solution of urea and an alkaline reagent, while the oil and resin solution is at a temperature above the decomposition temperature of urea, to form a product which is miscible with water and with mineral or gum spirits.

7. A process for producing a coating material which comprises heating a mixture including a vegetable oil having drying properties and a resin which at a temperature of 575° F. will form a solution with the oil at approximately such temperature, mixing with the resultant oil and resin solution an aqueous solution of urea and an alkaline reagent, while the oil and resin solution is at a temperature of approximately 450° F., to form a product which is miscible with water and with mineral or gum spirits.

8. A process for producing a coating material which comprises heating a mixture including a resin which melts at an elevated temperature and vegetable and mineral oils which in combination are miscible therewith and at least one of which has drying properties to a temperature sufficiently high to melt the resin and form a solution thereof with the oil, and mixing urea with said solution while it is at a temperature above the decomposition temperature of urea, to form a resultant product which is miscible with water and with mineral or gum spirits.

9. A coating material comprising the product resulting from adding urea to a solution including a resin dissolved in an oil having drying properties while the solution is at a temperature sufficiently high to decompose the urea, said product being miscible with water and with mineral or gum spirits.

10. A coating material comprising the product resulting from adding urea to a solution including a natural resin and a vegetable oil having drying properties while the solution is at a temperature sufficiently high to decompose the urea, said product being miscible with water and with mineral or gum spirits.

11. A coating material comprising the product resulting from adding urea to a solution including a synthetic resin and a vegetable oil having drying properties while the solution is at a temperature sufficiently high to decompose the urea, said product being miscible with water and with mineral or gum spirits.

12. A coating material comprising the product resulting from adding urea and an alkaline reagent to a solution including a natural resin and a vegetable oil having drying properties while the solution is at a temperature sufficiently high to decompose the urea, said product being miscible with water and with mineral or gum spirits.

13. A coating material comprising the product resulting from adding urea to a solution including a resin and a vegetable oil having drying properties while the solution is at a temperature sufficiently high to decompose the urea, said product being miscible with water and with mineral or gum spirits.

14. A coating material comprising the product resulting from adding urea and an alkaline reagent to a solution including a resin and a vegetable oil having drying properties while the solution is at a temperature sufficiently high to decompose the urea, said product being miscible with water and with mineral or gum spirits.

15. A coating material comprising the product resulting from adding urea to a solution including a resin and vegetable and mineral oils, at least one of which has drying properties, while the solution is at a temperature sufficiently high to decompose the urea, said product being miscible with water and with mineral or gum spirits.

16. A coating material comprising the product resulting from adding urea and an alkaline reagent to a solution including a resin and vegetable and mineral oils, at least one of which has drying properties, while the solution is at a temperature sufficiently high to decompose the urea, said product being miscible with water and with mineral or gum spirits.

17. A coating material comprising the product resulting from adding urea and potassium carbonate to a solution including a resin and a vegetable oil having drying properties while the solution is at a temperature sufficiently high to decompose the urea, said product being miscible with water and with mineral or gum spirits.

EUGEN HIRSCH.